US012777358B2

(12) United States Patent
Hong et al.

(10) Patent No.: US 12,777,358 B2
(45) Date of Patent: Oct. 27, 2026

(54) METHODS OF EARLY MEASUREMENT REPORTING WITH LP-WUS

(71) Applicant: InterDigital Patent Holdings, Inc., Wilmington, DE (US)

(72) Inventors: Jongwoo Hong, New York, NY (US); Young Woo Kwak, Woodbury, NY (US); Moon Il Lee, Melville, NY (US); Brian Martin, Farnham (GB); Prasanna Herath, Laval (CA); Nazli Khan Beigi, Longueuil (CA); Janet Stern-Berkowitz, Little Neck, NY (US); Virgile Garcia, Antibes (FR)

(73) Assignee: InterDigital Patent Holdings, Inc., Wilmington, DE (US)

( * ) Notice: Subject to any disclaimer, the term of this patent is extended or adjusted under 35 U.S.C. 154(b) by 246 days.

(21) Appl. No.: 18/794,739

(22) Filed: Aug. 5, 2024

(65) Prior Publication Data

US 2026/0040115 A1 Feb. 5, 2026

(51) Int. Cl.
*H04W 24/10* (2009.01)
*H04B 17/318* (2015.01)
*H04W 52/32* (2009.01)

(52) U.S. Cl.
CPC .......... *H04W 24/10* (2013.01); *H04B 17/328* (2023.05); *H04W 52/322* (2013.01)

(58) Field of Classification Search
CPC ... H04W 24/10; H04W 52/322; H04B 17/328
See application file for complete search history.

(56) References Cited

U.S. PATENT DOCUMENTS

2024/0049138 A1* 2/2024 Cui .................. H04W 52/0235
2024/0056967 A1 2/2024 Liu et al.
2024/0121716 A1* 4/2024 Kaikkonen ....... H04W 52/0235
(Continued)

FOREIGN PATENT DOCUMENTS

WO 2024148554 A1 7/2024

OTHER PUBLICATIONS

Third Generation Partnership Project, "Technical Specification Group Radio Access Network; Study on 1 low-power wake up signal and receiver for NR (Release 18)," 3GPP TR 38.869 V1.1.1, R1-2310773 (Oct. 2023).

(Continued)

*Primary Examiner* — Brian D Nguyen
(74) *Attorney, Agent, or Firm* — Volpe Koenig

(57) ABSTRACT

Methods are disclosed for a wireless transmit receive unit (WTRU) having a first radio, i.e., main radio (MR), and a second radio, i.e., a low power radio (LR) to initiate an early measurement reporting (EMR) procedure upon receiving a low-power wake up signal (LP-WUS) by the second radio, based on a received EMR configuration with one or more measurement time values. A radio resource control (RRC) message with an early measurement reporting (EMR) configuration may include an indication is to start a measurement timer upon receiving a low power wake-up signal (LP-WUS). Upon receiving the LP-WUS, the WTRU deactivates the first radio, activates the second radio and performs EMR measurements based on low power synchronization signals (LP-SS). Additional embodiments are disclosed.

20 Claims, 10 Drawing Sheets

(56) References Cited

U.S. PATENT DOCUMENTS

| | | | | |
|---|---|---|---|---|
| 2025/0351034 A1* | 11/2025 | Jung | ................. | H04W 36/0088 |
| 2025/0386293 A1* | 12/2025 | Dutta | .................... | H04W 24/10 |
| 2026/0040214 A1* | 2/2026 | Duan | ................ | H04W 52/0229 |
| 2026/0149992 A1* | 5/2026 | Fu | ......................... | H04W 24/10 |

OTHER PUBLICATIONS

Huawei, "New SID: Study on solutions for Ambient IoT (Internet of Things) in NR," 3GPP TSG RAN Meeting #102, RP-234058, Edinburgh, UK (Dec. 11-15, 2023).

Third Generation Partnership Project, "Technical Specification Group Radio Access Network; NR; User Equipment (UE) procedures in Idle mode and RRC Inactive state (Release 18)," 3GPP TS 38.304 V18.1.0 (Mar. 2024).

Third Generation Partnership Project, "Technical Specification Group Radio Access Network; NR; User Equipment (UE) procedures in Idle mode and RRC Inactive state (Release 18)," 3GPP TS 38.304 V18.2.0 (Jun. 2024).

Third Generation Partnership Project, "Technical Specification Group Radio Access Network; NR; Radio Resource Control (RRC) protocol specification (Release 18)," 3GPP TS 38.331 V18.2.0 (Jun. 2024).

* cited by examiner

METHODS OF EARLY MEASUREMENT REPORTING WITH LP-WUS

BACKGROUND

Recent efforts new radio (NR) have developed a Low-Power-Wake-Up Signal (LP-WUS). LP-WUS monitoring has the potential to reduce power consumption of UEs and other small battery powered devices. This is achieved by using a separate ultra-low power consumption receiver which can monitor wake-up signals (WUSs) and trigger and/or wake-up the Main radio Receiver (MR) dedicated for data and control signal transmission/reception.

Early measurement reporting (EMR) is a procedure to setup quickly for dual connectivity (DC) and/or carrier aggregation (CA) upon completion of radio resource control (RRC) connection setup (or resumption). To support this procedure, a UE may measure neighboring cell(s) while the UE is in idle and/or inactive state. For this measurement, an EMR configuration may be configured with an RRC release message (e.g., moving to idle (or inactive) state). The EMR configuration may include one or more parameters, e.g., validity area, a list of frequencies, a timer (e.g., measurement duration), a list of physical cells.

Upon receiving the EMR configuration, the UE changes RRC state (from connected to idle or inactive). During the idle or inactive state, the UE may initiate an EMR procedure (e.g., performing neighboring cell measurement) based on the received configuration. If at least one of the measured values is above the certain threshold, a UE may store the measurement results (e.g., RSRP and/or RSRQ value) of the one or more cell(s). It would be desirable to for an LP-WUS UE to enhance the EMR procedure with achieving power saving (e.g., relaxation of neighboring cell measurements) and reduce signaling with up-to-date results for CA setup (e.g., with LP-WUS cells).

SUMMARY

According to one aspect of the disclosure, a UE, also referred to herein as a wireless transmit receive unit (WTRU), includes a first radio, i.e., main radio (MR), and a second radio, i.e., a low power radio (LR). Upon receiving a LP-WUS on the second radio, the WTRU initiates performing an early measurement reporting (EMR) procedure based on a received EMR configuration with a measurement time via the second radio.

In a first aspect, a WTRU, and method for use by a WTRU having a first radio and a second radio, may generally include the WTRU receiving, from a network, a radio resource control (RRC) message with an early measurement reporting (EMR) configuration indicating at least a first measurement timer value and a second measurement timer value. The WTRU measures low power synchronization signal (LP-SS) quality of a serving cell based on one or more received LP-SSs. The WTRU receives a low power wake-up signal (LP-WUS) and based on receiving the LP-WUS, the WTRU starts a measurement timer, where on a condition that the measured LP-SS quality is above or equal to a first threshold, the WTRU initializies the measurement timer with the second measurement timer value and selects the second radio and on a condition that the measured LP-SS quality is below the first threshold, the WTRU initiales the measurement timer with the first measurement timer value and selects the first radio.

While the measurement timer is running, the WTRU performs measurements on signals received from neighboring cells using the selected first radio or second radio and upon the measurement timer expiring, the WTRU transmits a message including the measurements.

In one aspect, the EMR configuration includes an indication when to start the measurement timer. If the indication is to start the measurement timer upon receiving the LP-WUS, the WTRU deactivates the first radio, activates the second radio to monitor for the LP-WUS and measures a quality of a serving cell for receiving the LP-WUS. Otherwise the WTRU starts the measurement timer having a duration of the first measurement timer value and performs EMR measurements with the first radio for the duration of the first measurement timer value.

In one aspect, when the measured quality of the serving cell is equal to or greater than a configured first threshold, the WTRU receives the LP-WUS including an indication to trigger EMR, starts the measurement timer having a duration of the second measurement timer value and measures, for the duration of the second measurement timer value, one or more low power synchronization signals (LP-SSs) of one or more neighboring cells with the second radio based on the EMR configuration.

Alternatively, when the measured quality of the serving cell is less than the configured first threshold, the WTRU activates the first radio to trigger EMR measurements, starts the measurement timer for the duration of the first measurement timer value and measures one or more synchronization signals (SSs) and/or synchronization signal blocks (SSBs) of the one or more neighboring cells with the first radio based on the EMR configuration.

In another aspect, the WTRU stores EMR measurement results of the selected first radio or selected second radio for the one or more neighboring cells that are equal to or greater than a second threshold.

According to various aspects, the WTRU may initially receive, from the network, configuration information including a first configuration for monitoring the SS and/or SSB or a paging occasion (PO) with the first radio and a second configuration for monitoring the LP-SS or a LP-WUS occasion (LO) with the second radio, and the second configuration includes the first threshold of serving cell quality.

In another aspect, the WTRU may receive, from the network, a paging message associated with the LP-WUS or the PO and, in response, send a physical random access channel (PRACH) transmission to trigger a RRC connection setup or resumption procedure. The WTRU may receive, in response to the PRACH transmission, a RRC connection setup or resumption message and the WTRU reports the stored EMR measurement results of the one or more neighboring cells.

According to a further aspect, when a measured quality of the serving cell is greater than or equal to a configured relaxation threshold, the WTRU may perform relaxed radio resource management (RRM) measurements by the first radio of the one or more neighboring cells associated with the EMR configuration and during performing relaxed RRM measurements by the first radio, the WTRU may perform neighboring cell measurements with the second radio.

In one aspect, the second radio is a low power radio having an orthogonal frequency division multiplexing (OFDM) receiver or an on-off-keying (OOK) receiver and the first radio is a main radio (MR). In one example, the first threshold and the second threshold correspond to a respective reference signal received power (RSRP) value or reference signal received quality (RSRQ) value.

In various aspects, measuring the quality of the serving cell for receiving the LP-WUS is based on one or more LP-SSs received from the serving cell and/or the first measurement timer value is greater than the second measurement timer value. In other aspects the WTRU may include/be configured with a validation timer to maintain the accuracy of the EMR measurement results, i.e., the EMR measurements may be refreshed or determined invalid/not to be reported. Additional aspects, features and advantages are disclosed in the described embodiments that follow.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
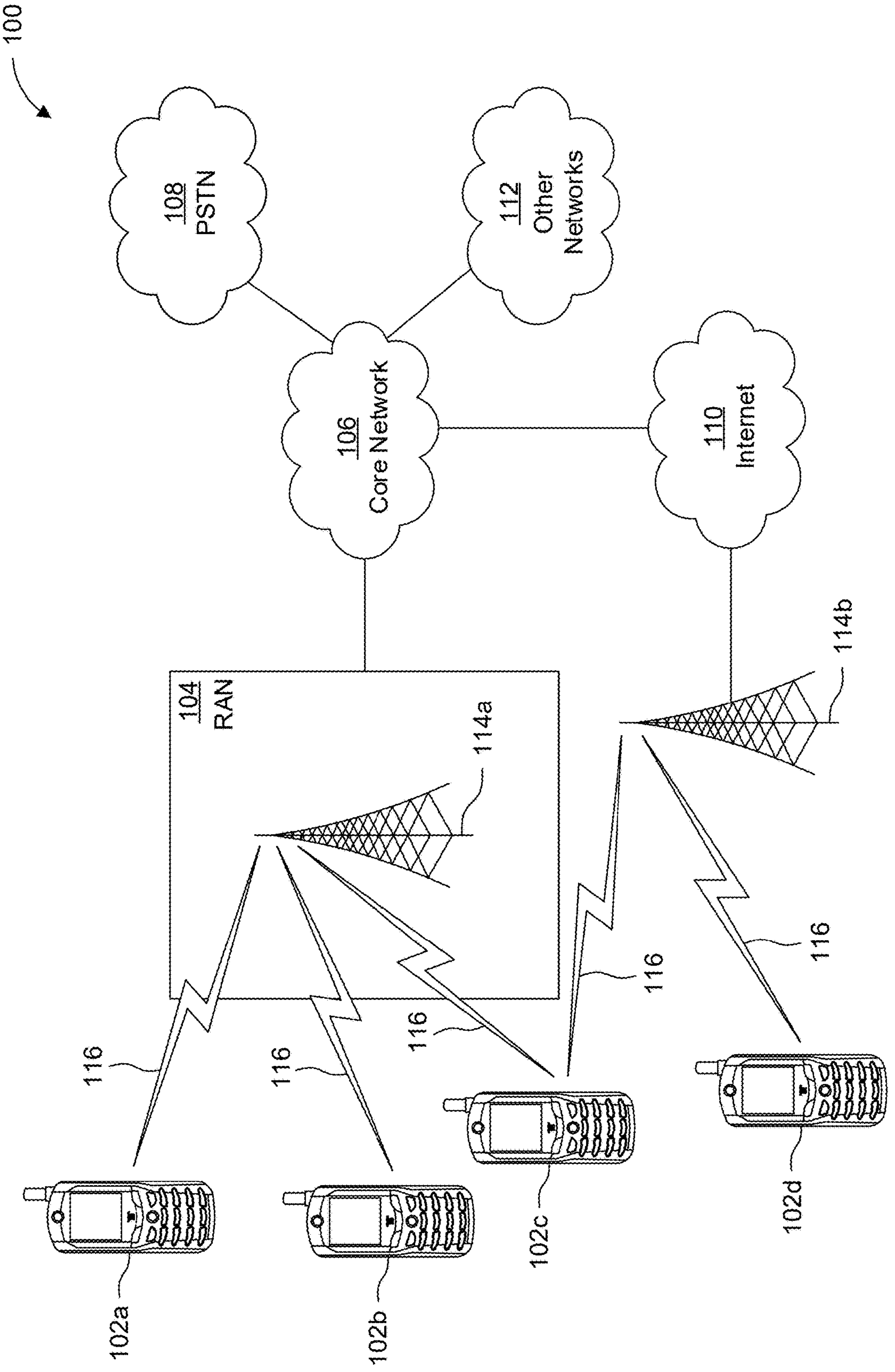
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, and the like. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
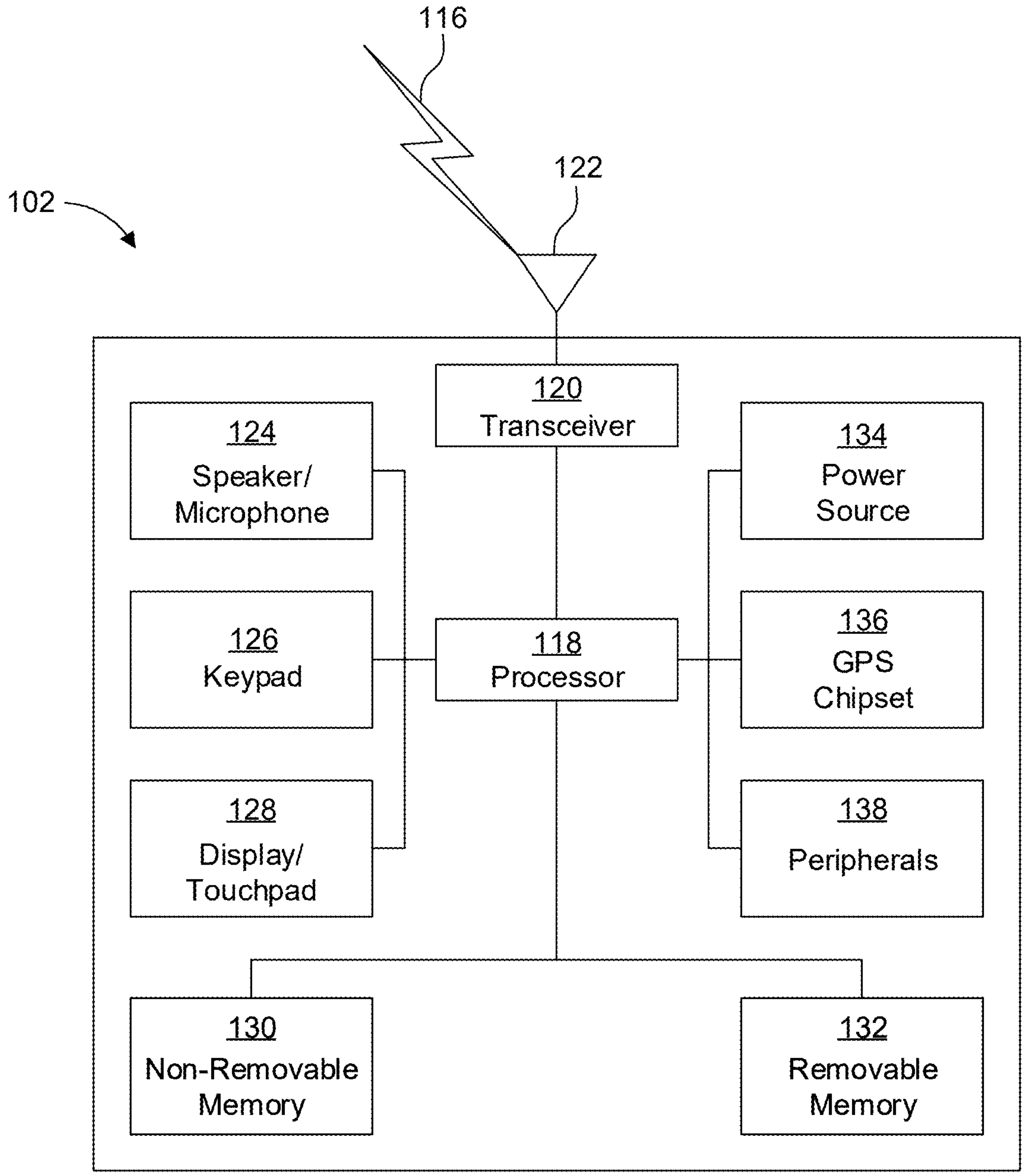
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
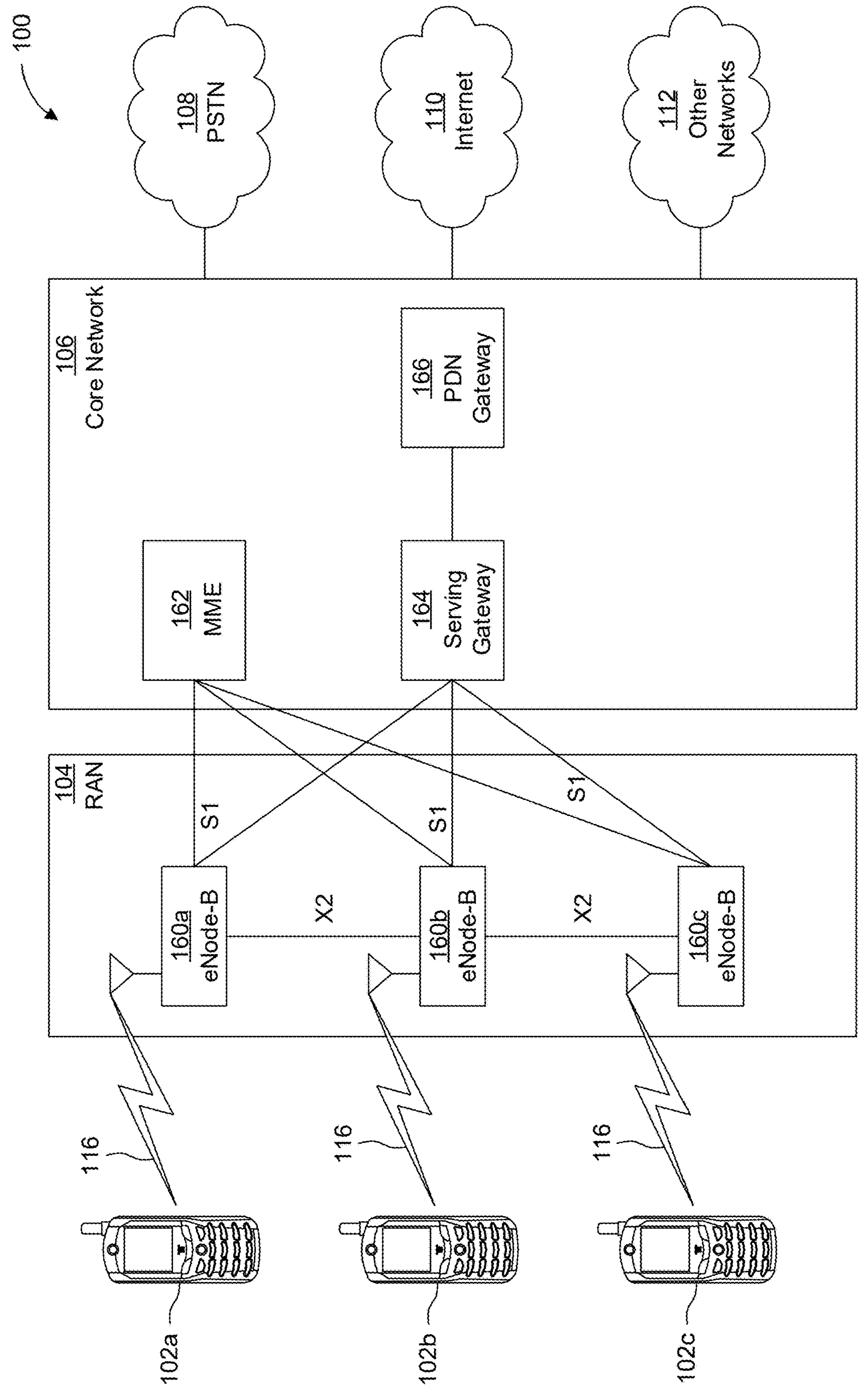
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHZ, and 20 MHz bandwidths in the TV White Space (TVWS) spectrum, and 802.11ah supports 1 MHZ, 2 MHZ, 4 MHZ, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
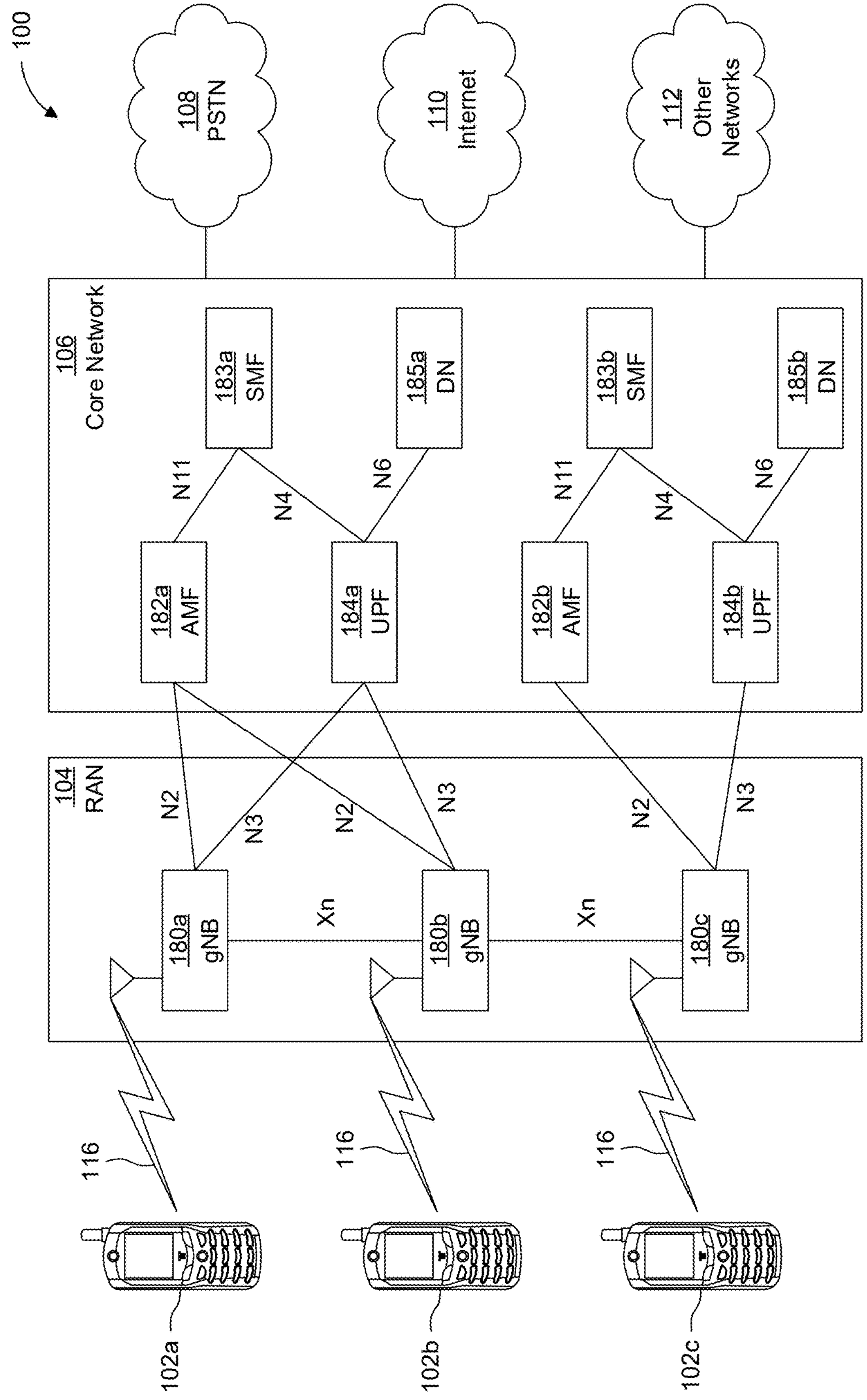
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106.

The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (COMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 106 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While the foregoing elements are depicted as part of the CN 106, it will be appreciated that any of these elements may be owned and/or operated by an entity other than the CN operator.

The AMF 182*a*, 182*b* may be connected to one or more of the gNBs 180*a*, 180*b*, 180*c* in the RAN 104 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of non-access stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and the like. The AMF 182*a*, 182*b* may provide a control plane function for switching between the RAN 104 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 106 via an N11 interface. The SMF 183*a*, 183*b* may also be connected to a UPF 184*a*, 184*b* in the CN 106 via an N4 interface. The SMF 183*a*, 183*b* may select and control the UPF 184_a_, 184_b_ and configure the routing of traffic through the UPF 184_a_, 184_b_. The SMF 183_a_, 183_b_ may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184_a_, 184_b_ may be connected to one or more of the gNBs 180_a_, 180_b_, 180_c_ in the RAN 104 via an N3 interface, which may provide the WTRUs 102_a_, 102_b_, 102_c_ with access to packet-switched networks, such as the Internet 110, to facilitate communications between the WTRUs 102_a_, 102_b_, 102_c_ and IP-enabled devices. The UPF 184, 184_b_ may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102_a_, 102_b_, 102_c_ with access to the other networks 112, which may include other wired and/or wireless networks that are owned and/or operated by other service providers. In one embodiment, the WTRUs 102_a_, 102_b_, 102_c_ may be connected to a local DN 185_a_, 185_b_ through the UPF 184_a_, 184_b_ via the N3 interface to the UPF 184_a_, 184_b_ and an N6 interface between the UPF 184_a_, 184_b_ and the DN 185_a_, 185_b_.

In view of FIGS. 1A-1D, and the corresponding description of FIGS. 1A-1D, one or more, or all, of the functions described herein with regard to one or more of: WTRU 102_a-d_, Base Station 114_a-b_, eNode-B 160_a-c_, MME 162, SGW 164, PGW 166, gNB 180_a-c_, AMF 182_a-b_, UPF 184_a-b_, SMF 183_a-b_, DN 185_a-b_, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 2:
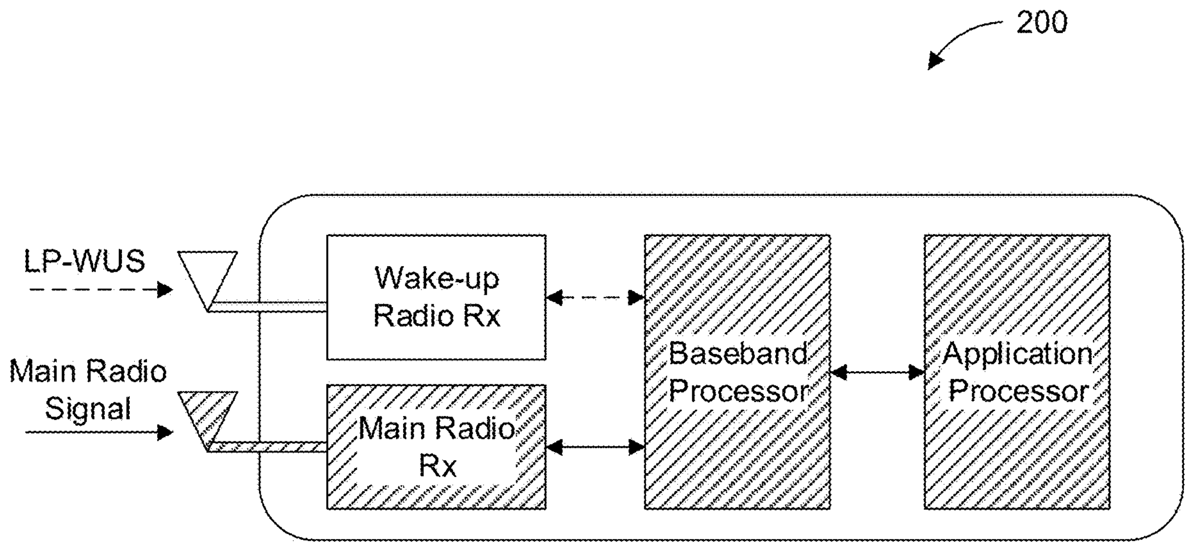
FIG. 2 is a block diagram illustrating an example of low-power wake-up signal (LP-WUS) receiver architecture.

As previously mentioned, 3GPP NR has recently adopted the use of a low-power-wake-up signal (LP-WUS). LP-WUS monitoring has the potential to reduce power consumption of WTRUs and other small battery powered devices. This is achieved by using a separate ultra-low power consumption receiver (LR) which can monitor wake-up signals (WUSs) and trigger and/or wake-up the main radio receiver (MR) dedicated for data and control signal transmission/reception. FIG. 2. illustrates an example architecture 200 of a Low-Power Wake-Up Receiver (LP-WUR).

In systems based on LP-WUS, the LP-WUR is configured with monitoring windows to monitor and detect potential LP-WUSs. The LP-WUR may be configured with a duty cycle for the monitoring occasions, where the duty cycle and monitoring windows should be selected to match with LP-WUS transmission time from a network (NW). In NR, the time and frequency synchronization are based on receiving synchronization signal blocks (SSBs) and using a primary synchronization signal (PSS) and/or a secondary synchronization signal (SSS) for synchronization.

In systems based on LP-WUS, the WTRU could receive the SSs and/or SSBs during MR's "ON mode", where the WTRU could use the received SSB for synchronization. However, in cases where the MR is configured with long "OFF mode" or sleeping periods, the clock frequency could drift at the WTRU. The clock frequency drift or frequency error could result in inaccuracy in LP-WUR's duty cycle. The difference in the NW's clock and LP-WUR's clock frequency could result in time mismatch between the LP-WUS transmission time from the NW and the LP-WUR's monitoring window. The time mismatch could lead to failed detection of LP-WUSs.

To avoid the time mismatch between the LP-WUS transmission time from the NW and the LP-WURs monitoring window, the WTRU may be configured to detect and receive periodic low-power synchronization signals (LP-SSs) to achieve accurate synchronization at the LP-WUR. The LP-SS could be based on On-Off Keying (OOK) symbols forming binary sequences, where the WTRUs with LP-WUS configurations could use the LP-WUR (e.g., based on OOK receivers) to detect and receive LP-SSs.

An LP-SS can be used for time and frequency synchronization with the serving cell. Moreover, a WTRU can use LP-SSs for radio resource management (RRM) measurements. As such, the NW may configure the LP-SS sequence associated with the serving cell in addition to a number of candidate LP-SS sequences associated with one or more neighboring cells, where the WTRU can make RRM measurements accordingly, for the serving cell and configured neighbor cells, respectively.

Early measurement reporting (EMR). The EMR procedure is focused on providing quick setup for dual connectivity (DC) and/or carrier aggregation (CA) upon completion of a radio resource control (RRC) connection setup (or resumption). To support the EMR procedure, a WTRU may measure characteristics of one or more neighboring cells while the WTRU in an idle and/or inactive state. For this measurement, an EMR configuration may configured with a RRC release message (e.g., moving the WTRU to idle (or inactive) state). The EMR configuration may include one or more parameters, e.g., validity area, a list of frequencies, a timer (e.g., measurement duration) and a list of physical cells.

Upon receiving the EMR configuration, the WTRU changes its RRC state (from connected to idle or inactive).

During the idle or inactive state, the WTRU initiates the EMR procedure (e.g., performing neighboring cell measurement) based on the received configuration. If at least one of the measured values is above the certain threshold, a WTRU may store the measurement results (e.g., RSRP and/or RSRQ value) of the one or more cell(s).

When a RRC connection (or resumption) is triggered (e.g., by receiving a paging message and/or an uplink (UL) transmission triggered), the WTRU may indicate an availability of EMR information (e.g., results of early measurement) to the network. Upon completion of the RRC connection (or resumption) procedure, the WTRU may report all the available measurement results (e.g., for candidate a primary secondary cell (PSCell) and/or one or more secondary cells (SCells)) to the connected network. Based on the reported measurements, the network is able to setup DC and/or CA immediately upon completion of the RRC connection (or resumption) via RRC reconfiguration procedure.

Figure 3:
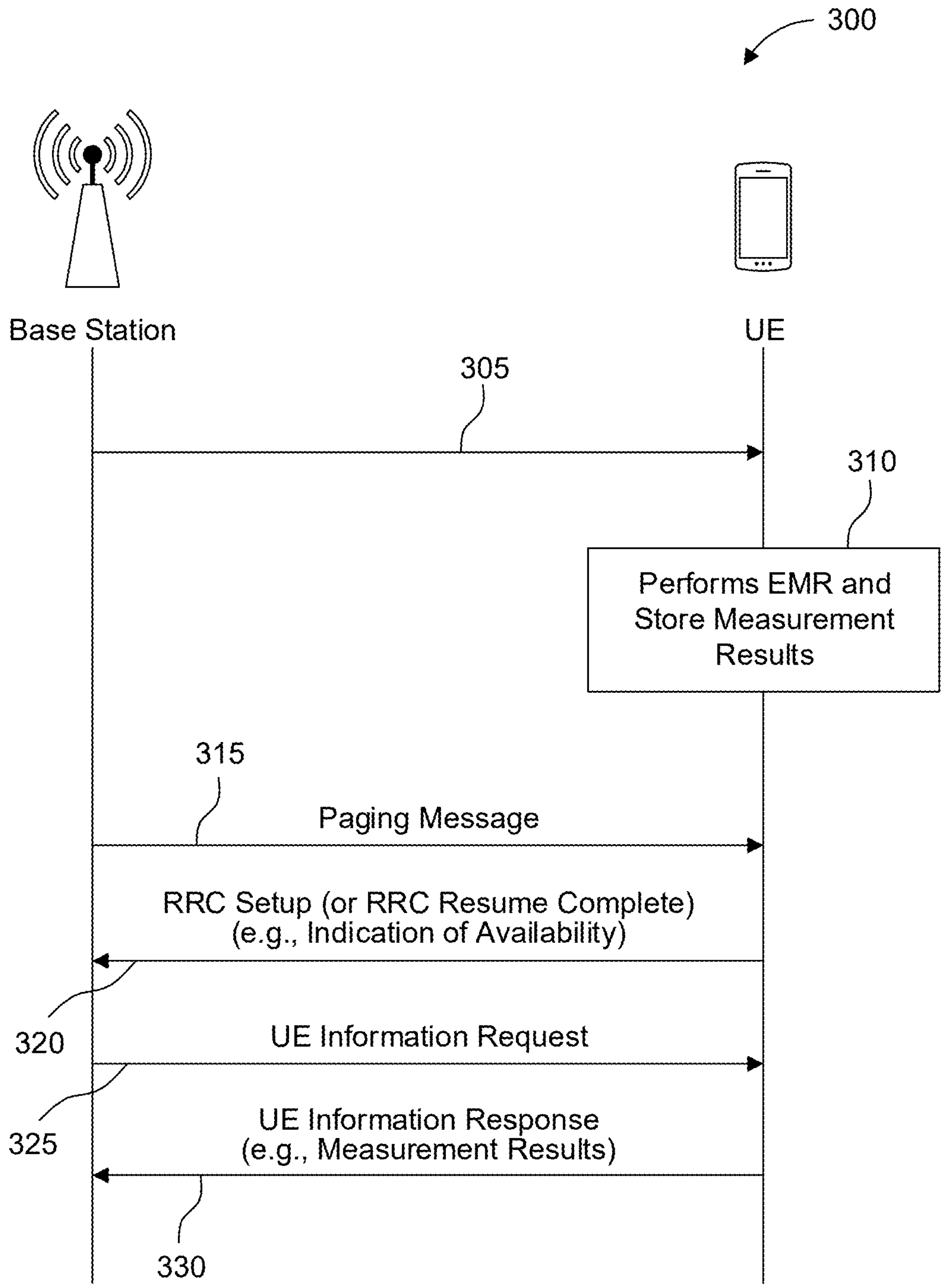
FIG. 3 is a network sequence diagram showing example signaling of an early measurement reporting (EMR) procedure.

Turning to FIG. 3, an example 300 of signaling for EMR procedure is shown. A WTRU receives 305 an RRC message, e.g., a RRC release with an EMR configuration, the WTRU transitions to idle or inactive state and performs 310 EMR with neighboring cells in the configuration based on their SSs and/or SSBs. The WTRU stores the EMR measurement results that are above a configuration threshold. When the WTRU receives 315 a paging message, the WTRU responds with a RRC setup or RRC resumption complete and indication of availability of EMR measurement results. If the network sends 325 an information request, the WTRU responds 330 with the stored EMR measurement results.

Figure 4:
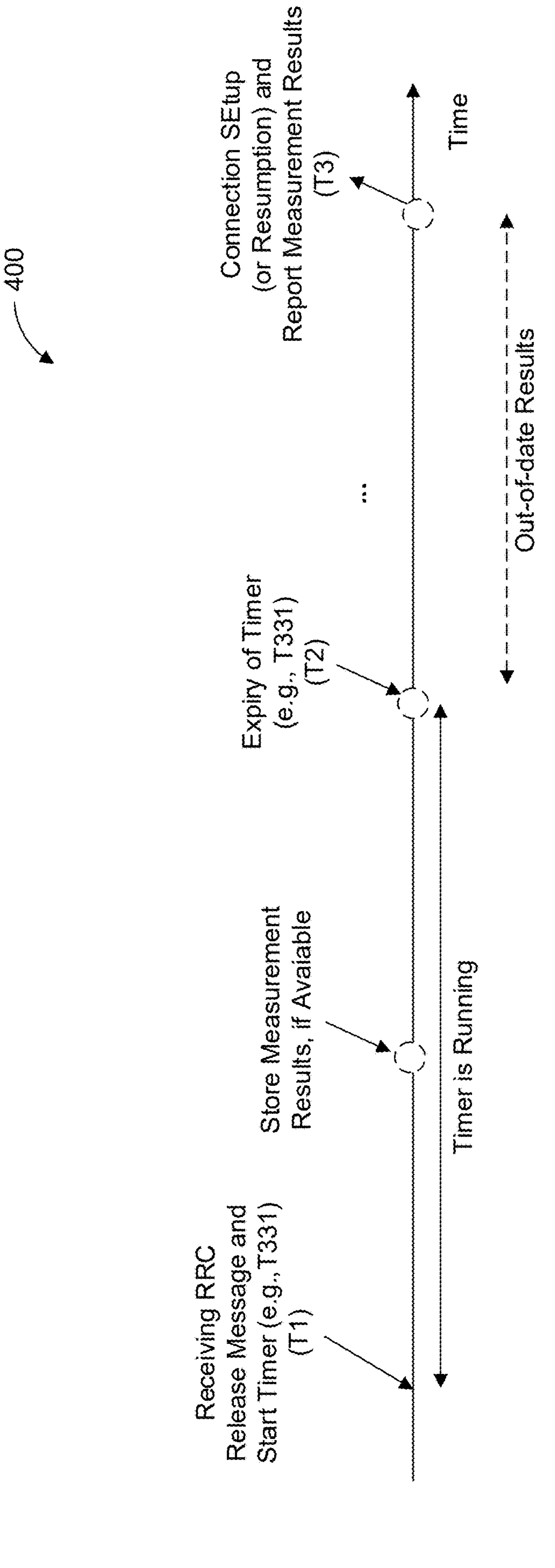
FIG. 4 is an example timing diagram showing an EMR procedure with out-of-date results due to expiration of a first timer.

Referring to FIG. 4, a timing diagram 400 is illustrative of a legacy EMR procedure. When the WTRU receives an RRC message with an EMR configuration, the WTRU immediately starts a T331 timer and initiates measuring neighboring cells (at T1) according to the received EMR configuration and stores measurement results (i.e., if measured results being available (e.g., higher than the threshold)). Upon expiry of T331 timer (at T2), the WTRU does not perform the EMR procedure anymore. If the RRC connection setup (or resumption) is triggered after a long time has passed (at T3) after expiry of T331 (at T2), the stored EMR measurement results may be out-of-date (e.g., no longer reflect a valid candidate PSCell and/or SCells). The larger the time gap is between T2 and T3, the likelihood of out-of-date measurement results is increased. For example, the measurement results of reference signal received power (RSRP)/reference signal received quality (RSRQ) of neighboring cell(s) at time T2 may change by time T3, due to changed channel conditions. For example, an idle/inactive WTRU may have mobility and some of the measured results for a PSCell and/or SCell in T2 may not be valid anymore at time T3 since the WTRU already moved between T2 and T3, e.g., nearer to other cells. This scenario may defeat the purpose of EMR as additional power/signaling consumption may not be avoided if the NW cannot use the out-of-date results.

For a LP-WUS-enabled WTRU, solutions on how to enhance the EMR procedure to further achieve power saving (e.g., relaxation of neighboring cell measurement) and/or reduce signaling with up-to-date results for CA setup (e.g., with LP-WUS cells) are needed.

Embodiments that follow may perform early measurement reporting (EMR) based on LP-WUS to address one or more of the aforementioned issues. Generally, upon receiving an LP-WUS, a WTRU may initiate performing an EMR procedure based on stored EMR configuration information with a measurement time via a second radio.

Figure 5:
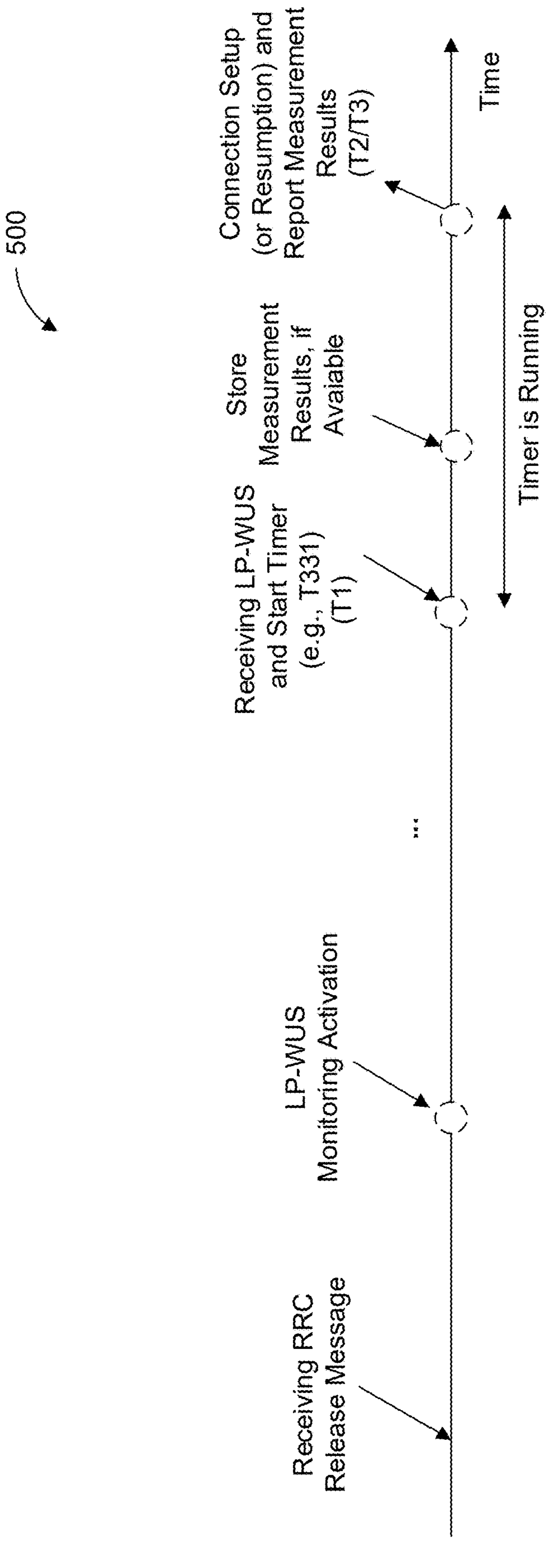
FIG. 5 is an example timing diagram showing comparative timing using a method of EMR procedure based on LP-WUS according to certain embodiments.

Referring to FIG. 5, an example timing diagram 500 is shown based one or more of the embodiments described below. FIG. 5 illustrates results of an exemplary solution for an EMR procedure based on LP-WUS. Upon receiving an RRC release message with an EMR configuration, a WTRU may maintain/store the EMR configuration and may not start a measurement timer (e.g., T331 or new timer) immediately. The WTRU may instead be activated to monitor for an LP-WUS signal and at time (T1) upon receiving a LP-WUS with an indication of EMR triggering, the WTRU may start a measurement timer and may measure one or more neighboring frequencies and/or cell(s) with a timer value based on the EMR configuration.

In one solution, the WTRU perform an EMR procedure with measuring neighboring cell(s) and storing measurement results until timer (e.g., T331 or a new timer) expiry at time (T2) and/or until connection setup (or resumption) at time (T3). For example, if the timer is not expired until RRC connection setup (or resumption), the WTRU may report available measurement results at time (T3), at which point the timer is expired/cancelled upon transmitting the results. In this case, the timing of T2 is at least the same timing (e.g., or after) as the timing of T3. For example, when a time gap between T2 and T3 is smaller, the possibility of out-of-date results would be decreased (or result in providing up-to-date measurement results). Given that if the timing of T2 and T3 may be equal, the measure results may be up-to-date and hence, out-of-date measurement results are not an issue.

This embodiments described herein may enable a WTRU to perform reduced measuring time and store up-to-date measurement results via the LR (or MR) since an EMR procedure is triggered upon reception of a LP-WUS. Based on the up-to-date measurement results, a network can setup DC (or CA) with LP-WUS cells immediately upon completion of RRC connection (or resumption).

In this disclosure, early measurement reporting (EMR) is used interchangeably to mean idle/inactive neighbor cell measurements and the embodiments are not limited to procedures or terminology of legacy EMR.

As used herein, a WTRU may have (e.g., WTRU capability) a MR (e.g., Main radio) and a LR (e.g., Low Power Wake-Up Radio). The terms MR (e.g., Main radio) and LR (e.g., Low Power Wake-Up Radio) used interchangeably with a first radio and second radio, respectively. As an example, the second radio (e.g., LP-WUR) may be one of an OOK-based receiver type or OFDM-based receiver type. As used herein, LP-WUS entry/exit condition may indicate monitoring for a LP-WUS signal and/or measuring the serving cell via the second radio (e.g., switching from the first radio to the second radio). As used herein, the term relaxation may be used interchangeably to mean relaxed RRM measurement of neighboring (or serving cell) measurement and RRM relaxation while measuring via the first radio and/or second radio. Furthermore, the term cell (e.g., service cell and/or neighboring cell) may be used interchangeably to mean the frequency/intra-frequency and/or inter-frequency and/or inter-RAT frequency.

Details of an EMR procedure are described. In one example, a WTRU in idle and/or inactive state may perform the EMR procedure (e.g., idle/inactive measurement) when the WTRU configured with an EMR configuration (e.g., idle/inactive measurement configuration) via an RRC release message or system information block (SIB).

In one example, a WTRU may initiate the EMR procedure when a timer (e.g., T331) is running. For example, the WTRU may measure based on an EMR configuration (e.g., measidleconfig). For example, the EMR configuration may include one or more parameters. For example, frequencies (e.g., neighboring/intra-RAT/inter-RAT) and/or measuring SS and/or SSB configuration (e.g., synchronization signal physical broadcast channel (SS/PBCH) block measurement timing configuration) and/or number of average and/or each of the frequencies is associated with a threshold value (e.g., RSRP and/or RSRQ value) and/or timer (e.g., T331 (measidleduration) or another timer).

In one example, when at least one of the measured values of a frequency among the configured frequencies of the EMR configuration is above the threshold, the WTRU may determine the frequency/frequencies/cell ID(s) should be reported to the network (e.g., as result(s) of EMR) and the WTRU stores the measurement results (e.g., measured value of the frequency that is above the threshold).

In one example, when a timer (e.g., T331) is expired during the EMR procedure, a WTRU may release EMR configuration. In one example, when a cell selection is triggered and the timer (e.g., T331) is running, if the serving cell is not included in the configured validity area, the WTRU may stop the timer and may release the EMR configuration.

Definition of downlink (DL) signals. In one example, a WTRU may measure the DL signals via a first radio and/or a second radio. The WTRU may measure DL signals via the first radio when the first radio is main radio or when the second radio type is the OFDM-based LP-WUR. In one example, a WTRU may measure at least one of the DL signals, e.g., SSB/SS/PBCH/PSS/SSS. In one example, a WTRU may receive a synchronization signal/physical broadcast channel (SS/PBCH) block. The SS/PBCH block (SSB) may include a primary synchronization signal (PSS), secondary synchronization signal (SSS), and physical broadcast channel (PBCH). The WTRU may monitor, receive, or attempt to decode an SSB during initial access, initial synchronization, radio link monitoring (RLM), cell search, cell switching, and so forth. In one example, the measurement value of the first radio may include one or more measurement values of, e.g., SS-RSRP and/or SS-RSRQ and/or synchronization signal signal interference to noise ratio (SS-SINR).

A WTRU may measure other DL signals via the second radio. The WTRU may measure DL signals via the second radio when the second radio is an OOK-based LP-WUR (e.g., OOK-1 or OOK-4 with M-1,2,4) or OFDM-based LP-WUR. In one example, a WTRU measure at least one of the DL signals, e.g., LP-SS (e.g., OOK symbols) and/or LP-WUS. In one example, the measurement value of the second radio may include one or more measurement values of, e.g., LP-received signal strength indicator (RSSI) and/or LP-RSRP and/or LP-RSRQ and/or LP-SINR.

Example RRM measurement procedures are described in the following.

Triggering intra/inter cell measurements. In one example, a WTRU may perform measurements of intra-frequency cells and/or NR inter-frequency cells and/or inter-RAT frequency cells according to the measurement rules based on the current Srxlev value (e.g., cell selection RX level value) of the serving cell and/or current Squal value (e.g., cell selection quality value) of the serving cell. In one example, the Srxlev value may indicate a RSRP value (e.g., SS-RSRP/LP-RSRP) and the Squal value may indicate a RSRQ value (e.g., SS-RSRQ/LP-RSRQ).

By way of example, the WTRU may not perform intra-frequency measurements based on the measurement results. In one example, the serving measurement results may fulfill Srxlev>$S_{IntraSearchP}$ and/or Squal>$S_{IntraSearchQ}$.

By way of example, the WTRU may perform intra-frequency measurements based on the measurement. In one example, the serving measurement results may fulfill Srxlev<$S_{IntraSearchP}$ and/or Squal<$S_{IntraSearchQ}$.

For example, the WTRU may not perform measurements of NR inter-frequency cells of equal or lower priority, or inter-RAT frequency cells of lower priority based on the measurement results. In one example, the serving measurement results may fulfill Srxlev>$S_{nonIntraSearchP}$ and/or Squal>$S_{nonIntraSearchQ}$.

For example, the WTRU may perform measurements of NR inter-frequency cells of equal or lower priority, or inter-RAT frequency cells of lower priority based on the measurement results. In one example, the serving measurement results may fulfill Srxlev<$S_{nonIntraSearch}$ and/or Squal<$S_{nonIntraSearchQ}$.

Serving cell measurement. In various embodiments, a WTRU may measure the SS-RSRP (or LP-RSRP) and/or SS-RSRQ (or LP-RSRQ) level of the serving cell and evaluate the cell selection criterion S for the serving cell. In one example, M1=2 if the SSB based measurement timing configuration (SMTC) periodicity (TSMTC)>20 ms and discontinuous reception (DRX) cycle≤0.64 second, otherwise M1=1). For example, the WTRU may filter the SS-RSRP (or LP-RSRP) and/or SS-RSRQ (or LP-RSRQ) of the serving cell using measurements. In one example, a WTRU may filter the SS-RSRP (or LP-RSRP) and/or SS-RSRQ (or LP-RSRQ) of the serving cell within the set of measurements used for the filtering, at least two measurements may be spaced by, at least extended DRX (eDRX)_IDLE cycle/2, if the WTRU is configured with eDRX cycle≤10.24 s; otherwise DRX cycle/2.

Intra cell measurement. In various embodiments, a WTRU may identify new intra-frequency cells and perform SS-RSRP (or LP-RSRP) and/or SS-RSRQ (or LP-RSRQ) measurements of the identified intra-frequency cells (without an explicit intra-frequency neighbor list containing physical layer cell identities). The WTRU may identify the new intra-frequency based on the measurement results with following examples:

In one example, the WTRU may evaluate whether a newly detectable intra-frequency cell meets the reselection criteria within $T_{detect,NR\_Intra}$ when that $T_{reselection}$=0.

In one example, the WTRU may measure SS-RSRP (or LP-RSRP) and/or SS-RSRQ (or LP-RSRQ) at $T_{measure,NR\_Intra}$ for intra-frequency cells that are identified and measured according to the measurement rules.

In one example, the WTRU may filter SS-RSRP (or LP-RSRP) and/or SS-RSRQ (or LP-RSRQ) measurements of each measured intra-frequency cell using measurements.

In one example, the WTRU may not consider a NR neighbor cell for cell reselection, if it is indicated as not allowed in the measurement control system information of the serving cell.

Inter cell measurement. In various embodiments, a WTRU may identify new inter-frequency cells and perform SS-RSRP (or LP-RSRP) and/or SS-RSRQ (or LP-RSRQ) measurements of identified inter-frequency cells if carrier frequency information is provided by the serving cell, even if no explicit neighbor list with physical layer cell identities is provided.

In one example, the WTRU may search for inter-frequency layers of higher priority $T_{higher\_priority\_search}$ where $T_{higher\_priority\_search}$. In one example, if the results of the measurement are satisfied (i.e., $S_{rxlev}$>$S_{nonIntraSearchP}$ and/or $S_{qual}$>$S_{nonIntraSearchQ}$).

In one example, the WTRU may search for and measure inter-frequency layers of higher, equal or lower priority in preparation for possible reselection. In one example, if the results of the measurement are satisfied (i.e., $S_{rxlev} \leq S_{nonIntraSearchP}$ Or $S_{qual} \leq S_{nonIntraSearchQ}$).

RRM relaxation criteria. In certain embodiments, a WTRU may perform relaxed RRM measurement while performing intra-frequency measurements or NR inter-frequency cells of equal or lower priority, or inter-RAT frequency cells of lower priority if one or more conditions (e.g., low mobility) are satisfied. The relaxed measurement criterion for a WTRU with low mobility is fulfilled. In one example, (SrxlevRef−Srxlev)<$S_{SearchDeltaP}$. In one example, after selecting and/or reselecting a new cell and/or if (Srxlev−SrxlevRef)>0, and/or if the relaxed measurement criterion has not been met for $T_{SearchDeltaP}$.

In one example, a WTRU may perform relaxed RRM measurement while performing intra-frequency measurements or NR inter-frequency cells of equal or lower priority, or inter-RAT frequency cells of lower priority. In one example, if one condition (e.g., not cell edge condition) is satisfied. In one example, Srxlev>$S_{searchThresholdP}$ and/or Squal>$S_{SearchThresholdQ}$, if $S_{SearchThresholdQ}$ is configured.

RRM measurement relaxation. In this disclosure, relaxed RRM measurement is considered when a condition (e.g., cell re-selection procedure and relaxation threshold) is satisfied to the quality of the serving cell measurement.

In one example, the WTRU may perform relaxed RRM measurement for intra frequency if the serving cell fulfills Srxlev<$S_{IntraSearchP}$ and/or Squal<$S_{IntraSearchQ}$ and/or the measurement results (e.g., serving cell measurements via second radio) is above the relaxation threshold.

In one example, the WTRU may perform relaxed RRM measurement for inter-frequency if the serving cell fulfills Srxlev<$S_{nonIntraSearchP}$ and/or Squal<$S_{nonIntraSearchQ}$ and/or the measurement results (e.g., serving cell measurements via the second radio) is above the relaxation threshold.

In one example, the relaxation threshold may indicate one or more conditions such as low mobility and/or not-at-cell edge conditions and/or other potential criteria and conditions.

LP-WUS monitoring. In some embodiments, a WTRU may be configured with a threshold (e.g., first threshold) for entry condition for LP-WUS monitoring. For example, a base station may transmit a message (e.g., with configuration including a first threshold) to the WTRUs via a SIB and/or via a RRC dedicated message. In one example, the first threshold may be associated with a LP-WUS monitoring entry and/or exit condition (e.g., whether monitoring for a LP-WUS with second radio or not). According to one example, if the serving cell quality (e.g., measured RSRP/RSRQ value) is above the first threshold, a WTRU may monitor for a LP-WUS (e.g., LP-WUS monitoring occasion (LO)) with the second radio. For example, if the serving cell quality is below the first threshold, a WTRU may monitor (e.g., a paging occasion) with the first radio (e.g., by turning on/activating the first radio, if needed).

In various embodiments, a WTRU may be configured with a threshold (e.g., a second threshold) for offloading for serving cell measurements. For example, a base station may transmit a message (e.g., a configuration including one or more thresholds) to the WTRUs via a SIB and/or RRC dedicated message. In one example, a second threshold may be associated with an offloading condition (e.g., serving cell measurement by the second radio from the first radio). For example, if a serving cell quality is above the second threshold, the offloading condition may be applied/activated.

In one example, a base station may configure the same value (e.g., RSRP/RSRQ) for the first threshold and/or the second threshold. In one example, a base station may configure different values for the first threshold and/or second threshold. (e.g., not the same value).

RRM measurement relaxation with EMR. In certain embodiments, a WTRU may be configured with one or more thresholds for offloading and/or RRM relaxation for serving cell and/or neighboring cell measurements. For example, a base station may transmit a message (e.g., configuration including the one or more thresholds) to the WTRUs via a SIB and/or RRC dedicated message. In one example, a first threshold may be associated with an offloading condition (e.g., serving cell measurement by the second radio from the first radio). For example, if a serving cell quality is above the first threshold, the offloading condition may be applied/activated.

In one example, a second threshold may indicate a threshold of the RRM relaxation (e.g., low mobility condition and/or not cell edge condition and/or another condition). The relaxation is associated with relaxed neighboring cell measurements. For example, if a serving cell quality is above the second threshold, the relaxed measurements may be applied/activated.

According to one example, a base station may configure the same value (e.g., RSRP/RSRQ) for the first threshold and/or the second threshold. In another example, a base station may configure different values for the first threshold and/or second threshold. (e.g., not the same value).

In various embodiments, a WTRU may be configured with an EMR configuration. For example, the EMR configuration may include one or more frequencies (e.g., neighboring frequencies/cell ID(s)).

In one solution, a WTRU may perform relaxed RRM measurement of neighboring cells with an EMR configuration when one or more thresholds (e.g., RRM relaxation and/or offloading condition and/or LP-WUS entry condition) of the serving cell qualities are satisfied (e.g., via first radio). For example, when the configured EMR configuration may include one or more neighboring frequencies/cell(s), a WTRU may perform the relaxed RRM measurement of neighboring cell measurement associated with the EMR configuration with first radio (e.g., (ultra-) sleep and/or no measurement).

When a WTRU may perform the relaxed RRM measurement of neighboring cell measurement associated with the EMR configuration with a first radio, a WTRU may perform neighboring cell measurement with the second radio. For example, if the second radio receiver type is an OFDM-based receiver or an OOK-based receiver.

One or more thresholds (e.g., RRM relaxation and/or LP-WUS entry condition) may be applied to both the first radio and the second radio. A WTRU may be configured with one threshold for the first radio and the second radio with (pre-) configured offset/compensate value(s). The measurement results of the second radio may be applied the (pre-) configured offset/compensate value(s). In one example, a (pre-) configured offset value (e.g., dBm and/or dB) of RSRP/RSRQ/SINR may be applied to the measurement results with the second radio.

In one example, a WTRU with a second radio may be configured with a threshold for the second radio. If the base station does not provide the threshold for the second radio, the WTRU may be configured to use a threshold for the first radio and applied the (pre-) configured offset value to the threshold for the first radio.

In certain embodiments, a network may indicate whether to apply the offset/compensate value(s) to the measurement results of the second radio. If the network indicates to apply the offset/compensate value for the measurement results of the second radio (e.g., based on OFDM-based and/or OOK-based LP-WUR), then WTRU may apply the offset/compensate value(s). Otherwise, the WTRU may not apply the offset/compensate value(s) to the measurement results of the second radio.

Figure 6:
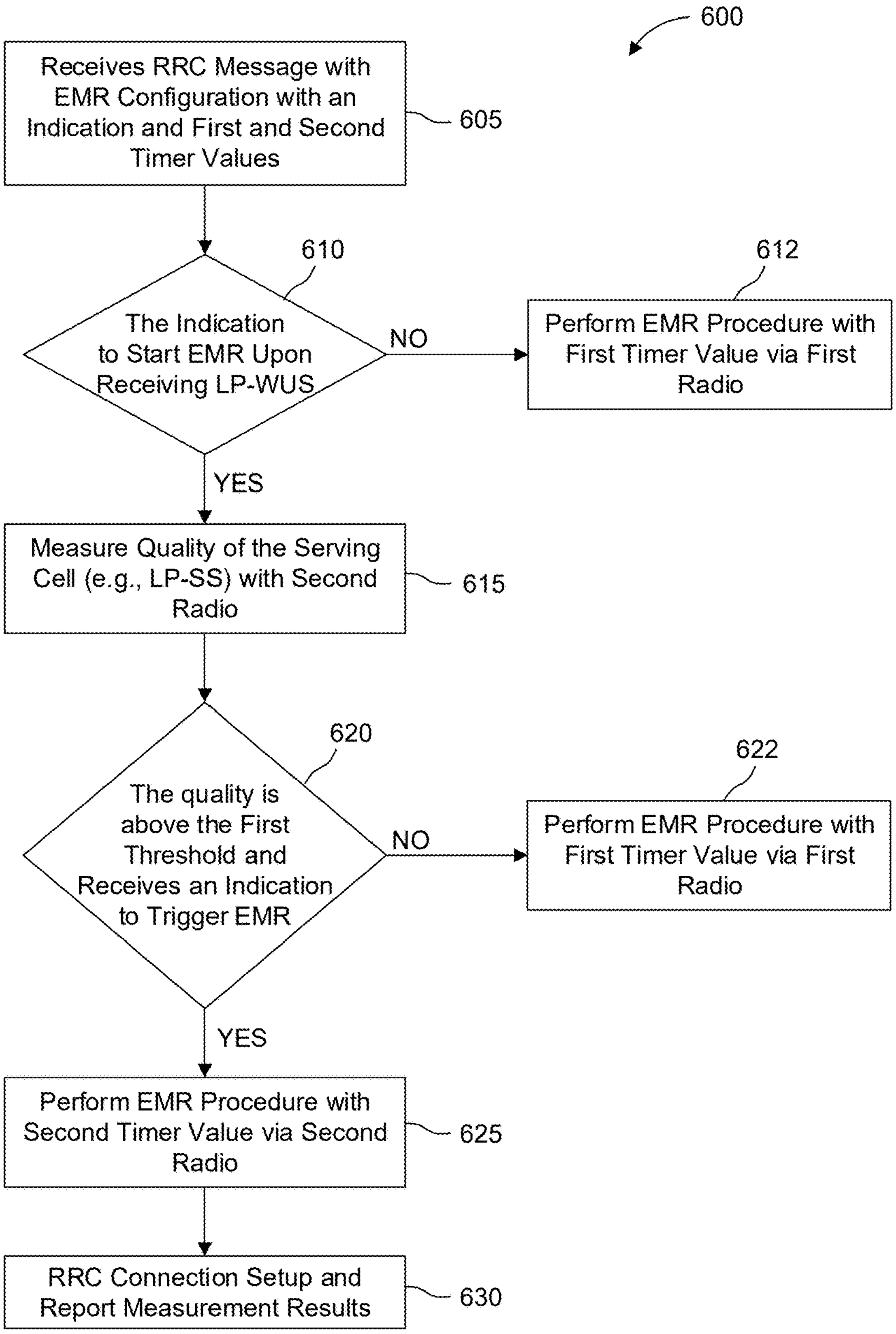
FIG. 6 is a flow diagram illustrating a method for a WTRU implementing an EMR procedure based on LP-WUS according to a first embodiment.

Referring to FIG. 6, an example method 600 for a WTRU having a first radio and a second radio performing an EMR procedure based on a LP-WUS with indication is shown. In one embodiment, a WTRU including a first radio (e.g., MR) and a second radio (e.g., LR) receives configuration including a configuration for SS and SSB and/or monitoring a paging occasion (PO) with the first radio and a configuration for LP-SS and/or monitoring a LP-WUS occasion (LO) with the second radio including a first threshold of serving cell quality (e.g., LP-WUS entry condition).

In this embodiment, a WTRU may further be configured with a EMR configuration and one or more timer values (e.g., a first timer value and/or a second timer value). In one example, the second timer value may be shorter than the first timer value. The first timer value may be applied/used when measuring with the first radio. The second timer value may be applied/used while performing EMR with the second radio.

As an example, a base station may provide an EMR configuration to the WTRU, e.g., by transmitting a message, e.g., a RRC release message, with an EMR configuration via an RRC dedicated message and/or via a SIB to the WTRU. For example, in method 600, a WTRU may receive 605 an EMR configuration via a RRC release message with a first measurement timer value, a second measurement timer value and a indication of when to start a measurement timer, such as an indication 610 whether to initiate an EMR procedure upon receiving an LP-WUS.

If 610, the received RRC message indicates to start the measurement timer upon receiving a LP-WUS, in one example, the WTRU may deactivate/sleep the first radio and activates the second radio to monitor for the LP-WUS. If 610, the received RRC message does not indicate to start the measurement timer upon receiving a LP-WUS, the WTRU performs 612 the EMR procedure immediately using the first radio, e.g., starting the measurement timer for a duration of the first measurement timer value, as in a legacy EMR procedure.

In the case of indication to start the measurement timer upon receiving the LP-WUS, according to one embodiment, while monitoring for the LP-WUS, the WTRU may measure 615 a quality of the serving cell using the second radio, e.g., based on one or more LP-SSs received from the serving cell. If 620, the measured quality of the serving cell is equal to or greater than a configured first threshold, the WTRU monitors for, and receives the LP-WUS including an indication to trigger EMR.

Upon receiving the LP-WUS with an indication of EMR triggering, the WTRU performs 625 the EMR procedure with the second radio by starting the measurement timer for a duration of the second measurement timer value and measuring, for the duration of the second measurement timer value, one or more low power synchronization signals (LP-SSs) of one or more neighboring cells based on the EMR configuration. For example, the measured neighboring cell may support LP-WUS to one or more WTRUs. In an example, the WTRU stores EMR measurements that meet or exceed a second configured threshold. When the measurement timer expires, or prior to expiration of the measurement timer, the WTRU may complete RRC connection setup (or resumption) and report 630 the stored EMR measurements, e.g., if requested by the network.

Alternatively, if 620 the measured quality of the serving cell is less than the configured first threshold, the WTRU activates the first radio to perform 622 EMR by starting the measurement timer for the duration of the first measurement timer value and measuring one or more synchronization signals (SSs) and/or synchronization signal blocks (SSBs) of the one or more neighboring cells based on the EMR configuration. The WTRU may store measurements that meet or exceed a configured second threshold and reports stored measurements, by network request, upon RRC connection setup/resumption.

In one solution, a WTRU may start the EMR procedure upon receiving an LP-WUS with indication (e.g., EMR triggering with additional requests). For example, an indication may indicate to start measurement timer for performing EMR procedure immediately. For example, an indication may indicate to start the measurement timer with a starting offset (e.g., slot(s)/subframe(s)/resource block(s)/sec(s)). In one example, an indication may be provided to indicate to receive/update/reconfigure an EMR configuration from the current serving cell and update the EMR configuration (e.g., frequencies) before performing EMR procedure and the WTRU may perform EMR procedure based on the updated EMR configuration.

In one solution, an indication of EMR triggering may indicate to perform EMR procedure with the first radio and/or the second radio. In one example, the indication may indicate to perform the EMR procedure with second radio if the WTRU includes an OOK-based type receiver or an OFDM-based type receiver.

In one solution, an indication of EMR triggering may indicate to perform EMR procedure and store measurement result(s) of one or more LP-WUS cell(s) (i.e., supporting LP-WUS). For example, an indication may indicate to perform EMR procedure and store measurement results of one or more cell(s) (e.g., not supporting LP-WUS). For example, an indication may indicate to perform EMR procedure and store measurement results of the one or more cells of any type (e.g., supporting LP-WUS and/or not supporting LP-WUS).

In one solution, an indication may indicate to perform EMR procedure and store measurement results of the one or more LP-WUS cell(s), if the measurement value of at least one of neighboring cell(s) is above a threshold measured by the second radio.

In certain embodiments, a WTRU may apply an offset value to the first threshold and/or determine a second threshold (e.g., first threshold−offset value=second threshold). For example, a WTRU may apply the second threshold while performing the neighboring cell measurement via the second radio. For example, a WTRU may apply the first threshold while performing the neighboring cell measurement via first radio.

In one example, the further offset value may be varied/applied based on the type of the second radio type (e.g., OOK-based type or OFDM-based type). For example, a WTRU may apply additional offset value to the second threshold and determine a third threshold (e.g., second threshold−offset value=third threshold). For example, a WTRU may apply the third may be varied based on the radio second radio type (e.g., OOK-based type or OFDM-based type). For example, a WTRU may apply the third threshold while performing measuring the neighboring cell measurement via second radio with OOK-based type. For example, a WTRU may apply the second threshold while performing measuring the neighboring cell measurement via second radio with OFDM-based type.

According to various embodiments, a WTRU may indicate an availability of measurement result(s) with EMR procedure during an RRC connection setup (or an RRC resumption). For example, a WTRU may indicate an availability of the measurement results (e.g., if stored one or more available measurement results of neighboring cells) via an UCI/MAC CE/RRC message (e.g., via RRC resume message or RRC setup complete message).

In one solution, a WTRU may indicate an availability measurement result(s) (e.g., as results of an EMR procedure) with the first radio and/or the second radio. For example, the availability indication may indicate and/or include the available measurement results performed by first radio. In an example, the availability indication may indicate/include the available measurement results performed by the second radio. For example, the availability indication may indicate/include the available measurement results performed by second radio with OOK-based receiver or performed by the second radio with OFDM-based receiver. In an example, the availability indication may indicate/include the measurement results are available for LP-WUS cell(s) or, the availability indication may indicate/include the measurement results are available for LP-WUS cell(s) and/or not supporting LP-WUS cell(s).

In one solution, a network may request measurement results (e.g., measurement results of EMR) via an downlink control information (DCI)/medium access control (MAC) control element (CE)/RRC message (e.g., a WTRU information request) after completion of RRC connection (or resumption). In another example, the network may request measurement results of the first radio and/or of the second radio. In another example, the network may request measurement results measured by second radio with an OFDM-based receiver or an OOK-based receiver. Any combination of the foregoing examples may be used.

According to other embodiments, an EMR procedure may be based on a LP-WUS with a validation timer as described below. In these embodiments, upon receiving a LP-WUS, a WTRU initiates performing an EMR procedure with a LR or MR based on validation timer running or expiry.

Figure 7:
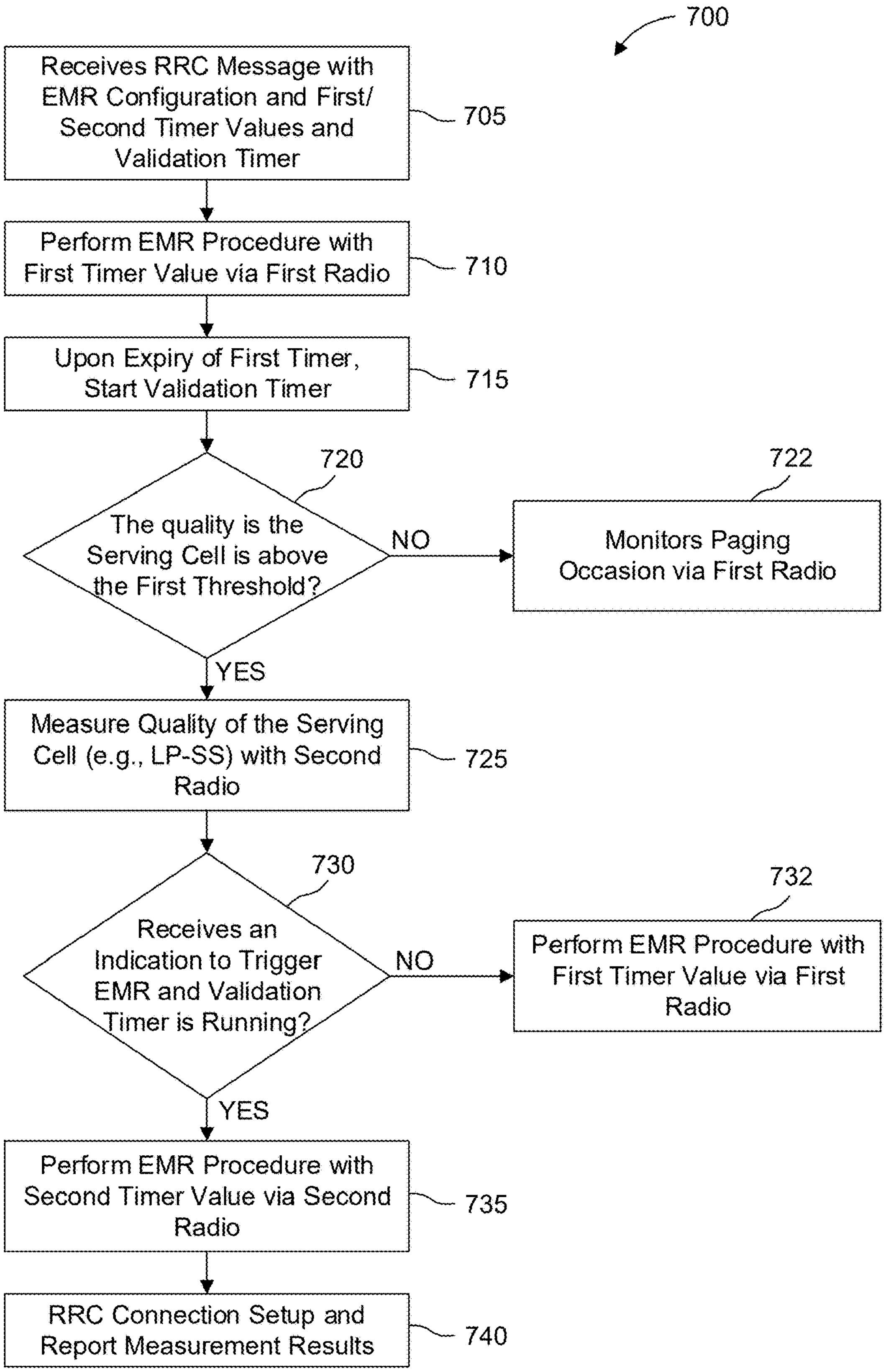
FIG. 7 is a flow diagram illustrating a method for a WTRU implementing an EMR procedure based on LP-WUS with validation timer according to a second embodiment.

Referring to FIG. 7, an example method 700 is shown for a WTRU performing an EMR procedure based on a LP-WUS with a validation timer.

In one example embodiment, a WTRU including a first radio (e.g., MR) and a second radio (e.g., LR) receives configuration information including a configuration for SS and/or SSB and/or monitoring a paging occasion (PO) with the first radio and a configuration for LP-SS and/or monitoring a LP-WUS occasion with the second radio including a first threshold of serving cell quality (e.g., LP-WUS entry condition). The WTRU may further be configured with a second threshold.

In method 700, the WTRU receives 705 a RRC message (e.g., RRC release) related to EMR configuration which includes one or more parameters such as a list of cell IDs, a list of carrier frequencies and associated with a second threshold (e.g., RSRP/RSRQ value) for determining whether to store EMR measurement results, a first measurement timer value (e.g., T331 or new timer), a second measurement timer value (e.g., second timer value<first timer value) and/or a validation timer value.

As an example, a WTRU receives a RRC release message and performs 715 an EMR procedure by starting the measurement timer with a duration of first measurement timer value and measuring one or more SSs and/or SSBs of one or more neighboring cells with the first radio based on the EMR configuration. The WTRU may stores EMR measurement results, e.g., if measurement results of neighboring cell(s) meet or exceed the configured second threshold.

Upon expiration of the first measurement timer, the WTRU starts 715 a validation timer with a duration of the configured validation timer value. If 720, a measured quality of serving cell (e.g., a received SSBs RSRP or RSRQ) is below the first threshold, the WTRU monitors 722 for a paging occasion (PO) with the first radio for RRC setup or RRS resumption an opportunity to report the EMR measurements of the first radio.

If 720 on the other hand, the measured quality of serving cell meets or exceeds the first threshold, the WTRU may deactivate/sleep the first radio and activate the second radio to monitor for a LP-WUS. Optionally, the WTRU may measure 725 a quality of the serving cell, e.g., via one or more received LP-SSs, with the second radio while the WTRU waits to receive a LP-WUS with an indication to trigger an EMR procedure.

If 730, the WTRU does not receive a LP-WUS with an indication to trigger EMR, e.g., within a monitoring occasion, or if the validation timer expires, the WTRU may perform 732 a second EMR procedure by activating/waking the first radio, starting the measurement timer with a duration of the first measurement timer value, and measuring one or more SSBs of one or more neighboring cells with first radio based on the EMR configuration similarly as done previously. The WTRU may store the EMR measurement results of neighboring cell(s) that meet or exceed the second threshold. The WTRU may or may not discard measurements of the previous EMR procedure.

If 730, the validation timer is still running and the WTRU receives the LP-WUS with an indication to trigger an EMR procedure, the WTRU may perform 735 a second EMR procedure with the second radio by starting the measurement timer having a duration based on the second measurement timer value and measuring one or more LP-SSs (or other new or existing signals) of one or more neighboring cells with second radio based on the EMR configuration. The WTRU may store measurement results of neighboring cells that meet or exceed the second threshold.

Upon receiving a paging message (e.g., associated with the received LP-WUS or PO), the WTRU sends a PRACH transmission triggering a RRC connection setup (or resumption) procedure and upon receiving the RRC connection setup (or resumption) message from the network, the WTRU may transmit an indication of availability EMR measurements. Upon receiving a request from the base station of measurement results of EMR, the WTRU reports 740 the measurement results. It is also possible for the measurement results to be provided with the PRACH transmission or as part of the indication of availability of EMR measurements.

In this manner a WTRU may reduce power consumed, measuring time and/or provide up-to-date measurement results via a LR (or MR) with reception of a LP-WUS indication of EMR triggering. Based on the validity timer running or not, the WTRU can perform EMR with LR with reduced measurement time.

Validation timer details. In one example, a WTRU may be provided with an EMR configuration and one or more timer values (e.g., first timer value and/or second timer value and/or validation timer). For example, the second timer value may be shorter than the first timer value. As an example, the first timer value may be applied/used when performing EMR with the first radio and/or the second timer value may be applied/used while performing EMR with the second radio. In some embodiments, a non-expired validation timer may also be used to indicate that the stored measurement results may not be out-of-date.

In various embodiments, a first threshold may be associated with a LP-WUS monitoring entry and exit condition (e.g., whether monitoring a LP WUS with second radio or not). For example, if the serving cell quality (e.g., measured RSRP/RSRQ value) is above the first threshold, a WTRU may monitor for a LP-WUS (e.g., LP-WUS monitoring occasion) with the second radio.

In one example, a WTRU may start an EMR procedure upon receiving an RRC release message with the EMR configuration. For example, a WTRU may start the EMR measurement timer with a first timer value and perform EMR procedure. In one solution, upon expiry of first measurement timer, the WTRU starts the validation timer and the WTRU may start the EMR procedure upon receiving a LP-WUS with indication (e.g., EMR triggering). For example, an indication may indicate to start a measurement timer for performing EMR procedure.

According to these embodiments, upon receiving the LP-WUS, e.g., with an indication of EMR triggering, the WTRU may check whether the validation timer is running or not. When the validation timer is running, the stored measurement results of the EMR may not be out-of-date. The WTRU may perform the EMR procedure with a second timer value using the second radio (e.g., EMR procedure with short time). In one example, the WTRU may not perform/or may skip a second EMR procedure if the stored measurement results are prior to the validation timer expiry.

In another example, when the validation timer expires, the stored measurement results of the EMR may be out-of-date and the WTRU may perform an EMR procedure with first timer value (e.g., EMR procedure with longer time) via the first radio.

As a summary for an embodiment for early measurement reporting (EMR) based on LP-WUS indication, upon receiving a LP-WUS, a WTRU initiates performing an EMR procedure (e.g., measuring cells and storing results) to report up-to-date measurement results.

The WTRU having a first radio (e.g., MR) and a second radio (e.g., LR) may initially receive configuration information including a first configuration for SS and/or SSB and/or monitoring PO with the first radio and a second configuration for LP-SS and/or monitoring LP-WUS occasions (LO) with the second radio including a first threshold of serving cell quality (e.g., LP-WUS entry condition).

The WTRU receives a RRC message (e.g., RRC release) related to an EMR configuration that includes one or more parameters such as a list of cell IDs, a list of carrier frequencies and associated with a second threshold (e.g., RSRP/RSRQ value), a first measurement timer value (e.g., T331 or new timer), a second measurement timer value (e.g., first timer value<second timer value) and an indication of when to start measurement timer (e.g., upon receiving LP-WUS or upon receiving the RRC release message).

If the indication of when to start the measurement timer indicates to start the timer upon receiving LP-WUS, the WTRU may deactivate/sleep the first radio, activate the second radio to monitor for the LP-WUS and to measure the quality of the serving cell (e.g., via one or more LP-SSs from the serving cell) for receiving the LP-WUS. Otherwise, upon receiving the RRC message, the WTRU starts the EMR measurement timer with a duration of the first timer value and performs EMR with the first radio.

If the measurement quality of serving cell is below the first threshold, the WTRU wakes-up the first radio and triggers an EMR procedure by starting a measurement timer with a duration of the second timer value and measures one or more SSs and/or SSBs of one or more neighboring cells with the first radio based on the EMR configuration. The WTRU stores EMR measurement results of neighboring cell(s) that meet or exceed the second threshold.

If the measurement quality of serving cell meets or exceeds the first threshold, the WTRU receives a LP-WUS with an indication triggering the EMR procedure, starts the measurement timer with a duration of the first timer value and measures one or more LP-SSs of one or more neighboring cells with the second radio based on the EMR configuration. The WTRU stores EMR measurement results of neighboring cell(s) that meet or exceed the second threshold.

Upon receiving a paging message (e.g., associated with the received LP-WUS or PO), the WTRU sends a PRACH transmission triggering a RRC connection setup (or resumption) procedure and upon receiving the RRC connection setup (or resumption) message from the base station, the WTRU transmits an indication of availability EMR/measurement results. Upon receiving a request of measurement results of EMR from the base station, the WTRU reports the measurement results.

As mentioned earlier, this solution enables a WTRU to perform reduced measuring time and store up-to-date measurement results via the LR (or MR) since the EMR procedure may be triggered upon reception of a LP-WUS, instead of the RRC release message. Based on the up-to-date measurement results, a network can setup DC (or CA) with LP-WUS cells immediately upon completion of RRC connection (or resumption).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for use by a wireless transmit receive unit (WTRU) having a first radio and a second radio, the method comprising:

receiving, from a network, a radio resource control (RRC) message with an early measurement reporting (EMR) configuration indicating at least a first measurement timer value and a second measurement timer value, wherein the first measurement timer value is greater than the second measurement timer value;

measuring low power synchronization signal (LP-SS) quality of a serving cell using a LP-SS received via the second radio;

receiving a low power wake-up signal (LP-WUS);

based on receiving the LP-WUS, starting a measurement timer, wherein, on a condition that the measured LP-SS quality is above or equal to a first threshold, initializing the measurement timer with the second measurement timer value and selecting the second radio; and on a condition that the measured LP-SS quality is below the first threshold, initialing the measurement timer with the first measurement timer value and selecting the first radio;

while the measurement timer is running, performing measurements on signals received from neighboring cells using the selected first radio or second radio; and upon the measurement timer expiring, transmitting a message comprising one or more of the performed measurements.

2. The method of claim 1, wherein selecting the first radio comprises activating the first radio and deactivating the second radio.

3. The method of claim 1, wherein selecting the second radio comprises activating the second radio and deactivating the first radio.

4. The method of claim 1, wherein performing measurements comprises measuring quality of one or more LP-SSs or synchronization signals (SS) from neighboring cells, storing quality measurements that are above or equal to a second threshold and not storing the quality measurements that are below the second threshold.

5. The method of claim 4, wherein the first threshold and the second threshold correspond to a respective reference signal received power (RSRP) value or reference signal received quality (RSRQ) value.

6. The method of claim 1, wherein the message comprising one or more performed measurements are measurements above or equal to a second threshold.

7. The method of claim 1, wherein the EMR configuration includes an indication of when to start the measurement timer.

8. The method of claim 1, further comprising:

when a measured SS quality of the serving cell is greater than or equal to a configured relaxation threshold, performing relaxed radio resource management (RRM) measurements by the first radio.

9. The method of claim 8, further comprising:

during performing relaxed RRM measurements by the first radio, performing neighboring cell measurements with the second radio.

10. The method of claim 9, wherein the second radio comprises a low power radio having an orthogonal frequency division multiplexing (OFDM) receiver or an on-off-keying (OOK) receiver.

11. The method of claim 1, wherein the first radio comprises a main radio (MR) and the second radio comprises a low power (LP) radio.

12. A wireless transmit receive unit (WTRU) comprising:

a transceiver including a first radio and a second radio, and a processor operatively coupled to the transceiver, the transceiver and the processor configured to:

receive, from a network, a radio resource control (RRC) message with an early measurement reporting (EMR) configuration indicating at least a first measurement timer value and a second measurement timer value, wherein the first measurement timer value is greater than the second measurement timer value;

measure low power synchronization signal (LP-SS) quality of a serving cell using a LP-SS received via the second radio;

receive a low power wake-up signal (LP-WUS);

based on the received the LP-WUS, start a measurement timer, wherein, on a condition that the measured LP-SS quality is above or equal to a first threshold, initialize the measurement timer with the second measurement timer value and select the second radio; and on a condition that the measured LP-SS quality is below the first threshold, initialize the measurement timer with the first measurement timer value and select the first radio;

while the measurement timer is running, perform measurements on signals received from neighboring cells using the selected first radio or selected second radio; and upon the measurement timer expiring, transmit a message comprising one or more of the performed measurements.

13. The WTRU of claim 12, wherein selecting the first radio includes the processor configured to activate the first radio and deactivate the second radio.

14. The WTRU of claim 12, wherein selecting the second radio includes the processor configured to activate the second radio and deactivate the first radio.

15. The WTRU of claim 12, wherein performing measurements includes the transceiver and processor configured to measure quality of one or more LP-SS or SS from neighboring cells, store quality measurements that are above or equal to a second threshold and not store the quality measurements that are below the second threshold.

16. The WTRU of claim 12, wherein the message comprising one or more of the performed measurements are measurements above or equal to a second threshold.

17. The WTRU of claim 12, wherein the EMR configuration includes an indication of when to start the measurement timer.

18. The WTRU of claim 12, wherein the transceiver and processor are further configured to:

when a measured SS quality of the serving cell is greater than or equal to a configured relaxation threshold, perform relaxed radio resource management (RRM) measurements by the first radio.

19. The WTRU of claim 18, wherein the transceiver and processor are further configured to:

during performing relaxed RRM measurements by the first radio, perform neighboring cell measurements with the second radio.

20. The WTRU of claim 19, wherein the second radio comprises a low power radio having an orthogonal frequency division multiplexing (OFDM) receiver or an on-off-keying (OOK) receiver.

* * * * *